United States Patent
Repo et al.

(10) Patent No.: US 10,611,609 B2
(45) Date of Patent: Apr. 7, 2020

(54) MOTOR ASSEMBLY AND HOIST DRIVE

(71) Applicant: KONECRANES GLOBAL CORPORATION, Hyvinkää (FI)

(72) Inventors: Anna-Kaisa Repo, Hyvinkää (FI); Toni Uusiniitty, Hyvinkää (FI); Jarmo Vepsäläinen, Hyvinkää (FI); Lauri Hietanen, Hyvinkää (FI); Marko Haalahti, Hyvinkää (FI)

(73) Assignee: KONECRANES GLOBAL CORPORATION, Hyvinkää (FI)

( * ) Notice: Subject to any disclaimer, the term of this patent is extended or adjusted under 35 U.S.C. 154(b) by 771 days.

(21) Appl. No.: 15/032,560

(22) PCT Filed: Dec. 1, 2014

(86) PCT No.: PCT/FI2014/050931
§ 371 (c)(1),
(2) Date: Apr. 27, 2016

(87) PCT Pub. No.: WO2015/082766
PCT Pub. Date: Jun. 11, 2015

(65) Prior Publication Data
US 2016/0264382 A1    Sep. 15, 2016

(30) Foreign Application Priority Data
Dec. 4, 2013   (FI) .................................. 20136220

(51) Int. Cl.
*G01R 31/08* (2020.01)
*B66C 13/26* (2006.01)
(Continued)

(52) U.S. Cl.
CPC .............. *B66C 13/26* (2013.01); *B66C 13/28* (2013.01); *B66D 1/12* (2013.01); *H02K 17/30* (2013.01);
(Continued)

(58) Field of Classification Search
CPC ...... B66C 13/26; B66C 13/28; H02P 2207/01
See application file for complete search history.

(56) References Cited

U.S. PATENT DOCUMENTS

| 2,386,581 A | 10/1945 | Wickerham |
| 3,209,225 A | 9/1965 | Choudhury |

(Continued)

FOREIGN PATENT DOCUMENTS

| DE | 26 20 346 A1 | 11/1977 |
| EP | 0 588 234 A2 | 3/1994 |

(Continued)

OTHER PUBLICATIONS

Extended European Search Report dated Jun. 12, 2017, for European Application No. 14867662.0.
(Continued)

*Primary Examiner* — Muhammad S Islam
(74) *Attorney, Agent, or Firm* — Birch, Stewart, Kolasch & Birch, LLP

(57) ABSTRACT

A motor assembly includes a three-phase asynchronous machine equipped with three stator phases, a capacitor assembly to establish self-excited generator operation of the asynchronous machine, a load resistor assembly to establish resistive load for self-excited generator operation of the asynchronous machine, and a load resistor switch which is arranged to connect the load resistor assembly to the stator phases. The load resistor assembly is asymmetrical.

18 Claims, 3 Drawing Sheets

(51) Int. Cl.
  *H02K 17/30* (2006.01)
  *B66C 13/28* (2006.01)
  *H02P 3/22* (2006.01)
  *B66D 1/12* (2006.01)
  *B66C 23/02* (2006.01)

(52) U.S. Cl.
  CPC ............... *H02P 3/22* (2013.01); *B66C 23/02* (2013.01); *H02P 2207/01* (2013.01)

(56) References Cited

U.S. PATENT DOCUMENTS

| | | | |
|---|---|---|---|
| 3,581,168 A | 5/1971 | Kirkby | |
| 3,688,171 A | 8/1972 | Salihi et al. | |
| 3,708,734 A | 1/1973 | Rowe | |
| 4,532,465 A * | 7/1985 | Renard | H02K 17/30 318/762 |
| 5,936,375 A | 8/1999 | Enoki | |
| 2013/0101397 A1 * | 4/2013 | De Wergifosse | B64D 15/12 415/121.3 |
| 2013/0234679 A1 * | 9/2013 | De Wergifosse | H02P 9/46 322/47 |
| 2014/0021890 A1 * | 1/2014 | Herrera | B02C 25/00 318/375 |

FOREIGN PATENT DOCUMENTS

| | | |
|---|---|---|
| GB | 929778 A | 6/1963 |
| GB | 953790 | 4/1964 |
| GB | 1 268 602 | 3/1972 |
| GB | 1 390 432 | 4/1975 |
| GB | 1474414 A | 5/1977 |
| SU | 890537 A2 | 12/1981 |

OTHER PUBLICATIONS

Shen et al., "Establish of Element for Dynamic Braking", Proceedings of the 4th World Congress on Intelligent Control and Automation, Jun. 10-14, 2002, Shanghai, China, Conference Proceedings Article, pp. 3196-3198, XP 010594188, whole document.

* cited by examiner

MOTOR ASSEMBLY AND HOIST DRIVE

BACKGROUND OF THE INVENTION

The invention relates to a motor assembly and a hoist drive including the motor assembly in question.

In certain operating situations, such as blackouts, an emergency load lowering needs to be carried out by a hoist drive. There are several known ways to perform an emergency load lowering. An emergency load lowering may be performed by controlling the brake in the hoist drive in such a manner that the lowering rate of a load is maintained within the allowed limits during the emergency lowering. Publication EP 0 588 234 discloses one of the known hoist drives in which a three-phase asynchronous machine of the hoist drive is used during an emergency lowering as a self-excited generator, and the power produced by generator operation during the emergency lowering is consumed by a load resistor assembly consisting of identical load resistors connected in a triangle.

The manual performing of an emergency lowering by adjusting the brake of the hoist drive is problematic because it requires controlling the brake manually from a service platform. Manual control is demanding, and if the emergency lowering should fail, the operator may find himself in a serious danger situation. The problem in the hoist drive of publication EP 0 588 234 is that an emergency lowering can only be optimized for a load of a particular size. If the load is substantially smaller at emergency lowering than the load for which the hoist drive is optimized, the voltage of the asynchronous machine will drop so low that self-excited generator operation ends whereby the load starts accelerating as a result of the earth's gravity. Once the speed has risen high enough, generator operation may be resumed. This, however, requires very big excitation capacitors.

BRIEF DESCRIPTION OF THE INVENTION

An object of the invention is to develop a hoist drive with which the performing of an emergency lowering of a load is simple and safe. A second object of the invention is to develop a motor assembly for the aforementioned hoist drive.

The invention is based on the idea that resistive load for self-excited generator operation of an asynchronous machine is achieved by an asymmetric load resistor assembly. An asymmetric load resistor assembly is a load resistor assembly which is arranged to establish such a resistive load between the phases of a first pair of stator phases, which is unequal to the resistive load that the load resistor assembly in question is arranged to establish between the phases of a second pair of stator phases, the second pair of stator phases being different from the first pair of stator phases.

The benefit of the hoist drive according to the invention is the simplicity and safety of carrying out an emergency lowering. In addition, depending on the embodiment, the invention makes it possible to reduce the number of components in the motor assembly and/or the capacitance of the capacitors.

The hoist drive according to the invention is best suited to sites where an emergency lowering of a load is relatively seldom needed and where the height of an emergency lowering of a load is not very great. This is due to the fact that in some embodiments the current of at least one stator phase may during an emergency lowering of a load be higher than the nominal current of the stator phase in question.

BRIEF DESCRIPTION OF THE DRAWINGS

The invention is now described in closer detail in connection with preferred embodiments and with reference to the accompanying drawings, in which.

DETAILED DESCRIPTION OF THE INVENTION

Figure 1:
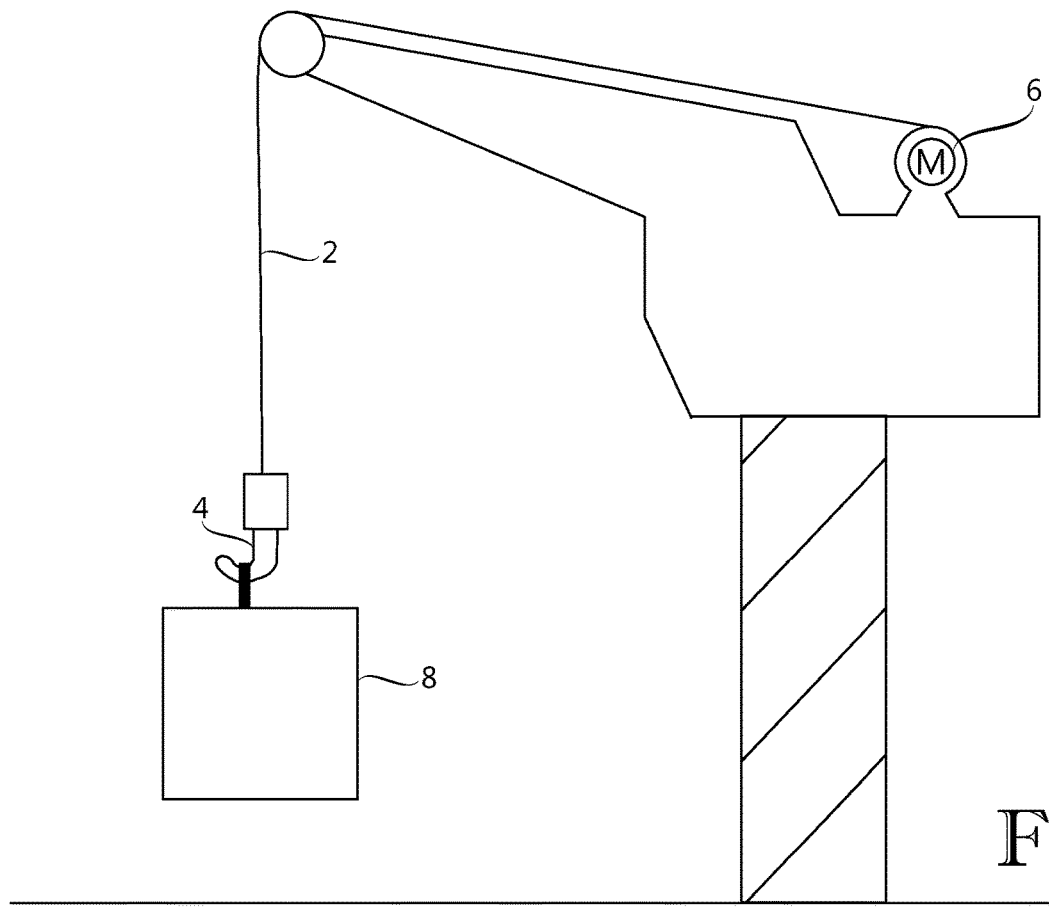
FIG. 1 shows an overview of a hoist drive according to an embodiment of the invention.

FIG. 1 shows a hoist drive which comprises a rope 2, a hoisting member 4 secured to the rope, and a motor assembly 6 which is operationally connected to the rope 2 to lift a load 8 by means of the hoisting member 4.

Figure 2:
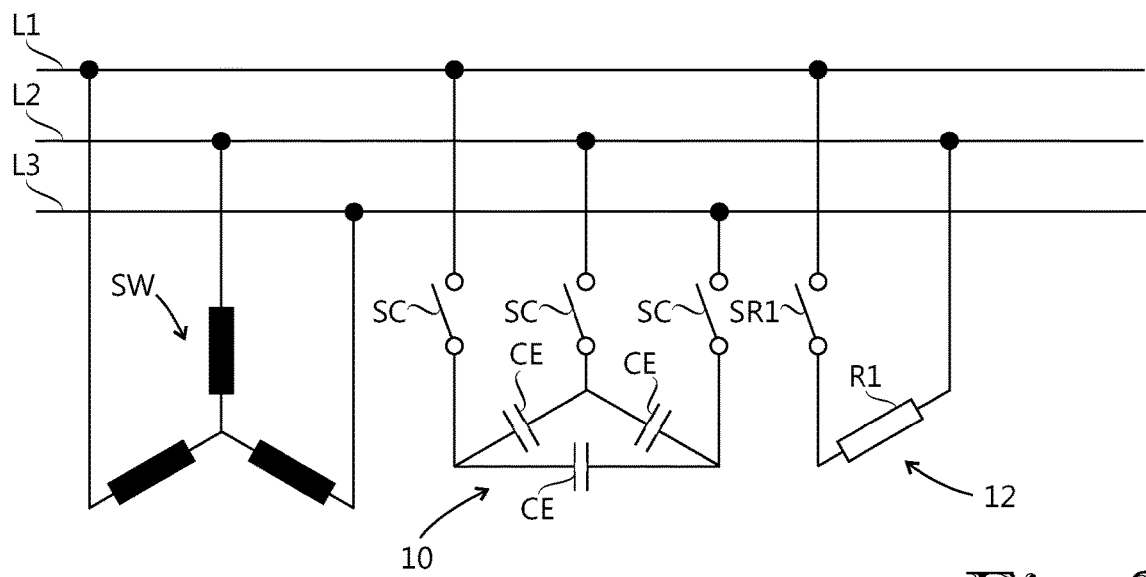
FIG. 2 shows a simplified schematic diagram of the motor assembly according to the hoist drive of FIG. 1.

FIG. 2 shows a simplified schematic diagram of the motor assembly of the hoist drive of FIG. 1. The motor assembly comprises a three-phase asynchronous machine, a capacitor assembly 10 to establish self-excited generator operation of the asynchronous machine, and a load resistor assembly 12 to establish resistive load for self-excited generator operation of the asynchronous machine.

The three-phase asynchronous machine is equipped with three stator phases L1, L2, and L3. The stator winding SW of the three-phase asynchronous machine is connected to the stator phases. The stator phases L1, L2, and L3 are under normal conditions arranged to be in contact with the phases of a power source, such as those of a frequency converter, to feed power from the power source to the three-phase asynchronous machine. FIG. 2 does not show the rotor of the three-phase asynchronous machine.

The capacitor assembly 10 comprises three excitation capacitors CE which are connected by a delta connection to the stator phases L1-L3 through a capacitor switch means. The capacitances of the excitation capacitors CE are mutually essentially equal. The capacitor switch means comprises three capacitor switches SC, and is arranged to connect the capacitor assembly 10 to the stator phases L1, L2, and L3 as controlled by the operator. When the operator wishes to initiate an emergency load lowering, he connects the capacitor assembly 10 to the stator phases L1, L2, and L3 by controlling the capacitor switch means.

In an alternative embodiment of the invention, controlling the capacitor switch means may be automatized. In a second alternative embodiment, the operator may choose whether the capacitor switch means is controlled automatically or manually. The motor assembly may be arranged such that at the beginning of an emergency load lowering situation both the capacitor assembly and the load resistor assembly are connected to the stator phases and kept connected to the stator phases until the end of the emergency lowering situation.

The capacitor switch means is arranged to connect the capacitor assembly symmetrically to all the three stator phases to establish self-excited generator operation of the asymmetric motor. The excitation capacitors may be connected by a star connection instead of the delta connection, but in such a case the capacitance of the excitation capacitors needs to be increased in order to achieve the same reactive power.

In self-excited generator operation of an asynchronous machine, the inductances of the stator winding SW and the capacitances of the excitation capacitors CE of the capacitor assembly 10 form a resonant circuit so that the asynchronous machine acquires the reactive power it needs from the capacitor assembly 10. In a normal situation, an asynchronous machine gets the reactive power it needs from the power distribution network. In this context, self-excited generator operation of an asynchronous machine refers to the operation of the asynchronous machine as a generator in a situation where the stator phases L1-L3 are not affected by an external voltage. Such a situation may emerge as a result of, for example, a blackout or the frequency converter feeding the asynchronous machine developing a fault.

The load resistor assembly 12 comprises one load resistor R1, only, which is arranged to be connected between the stator phases L1 and L2 of an asynchronous machine during self-excited generator operation of the asynchronous machine. The load resistor assembly 12 is asymmetrical, because a load resistor may only be connected between the stator phases L1 and L2, and both the resistance between the stator phases L1 and L3 and the resistance between the stator phases L2 and L3 is infinite.

The motor assembly comprises a load resistor switch means which is arranged to connect the load resistor assembly 12 to the stator phases L1 and L2. The load resistor switch means comprises one resistor switch SR1.

The load resistor switch means and the capacitor switch means are arranged to be controlled by the same signal, that is, the resistor switch SR1 and the capacitor switches SC are controlled by the same control signal. Consequently, the resistor switch SR1 closes essentially at the same time as the capacitor switches SC and opens essentially at the same time as the capacitor switches SC. When the operator of the hoist drive connects the capacitor assembly 10 to the stator phases L1-L3, the load resistor R1 is at the same time connected between the stator phases L1 and L2. As a result of the asymmetry of the load resistor assembly 12, the self-excitation of the asynchronous machine starts reliably. The means required to form the control signal for the load resistor switch means and the capacitor switch means, or the wires used for transferring the control signal, are not shown in FIG. 2.

The load resistor switch means and the capacitor switch means are arranged to be controlled essentially simultaneously in an emergency load lowering situation. In an alternative embodiment, the load resistor switch means and the capacitor switch means are arranged to be controlled by different signals, the time difference between which is shorter than a predetermined threshold value. The motor assembly control is arranged to be such that the load resistor switch means is always controlled to close with the capacitor switch means.

In an embodiment, the motor assembly comprises a change-over switch, which is arranged to connect the load resistor assembly and the capacitor assembly in place of the normal power supply. In such a case, the aforementioned change-over switch comprises the load resistor switch means and the capacitor switch means. The motor assembly according to the invention may be implemented so that no power supply at all is needed to control the emergency lowering procedure, whereby all the electricity produced by self-excited generator operation of the asynchronous machine is used up in the load resistor assembly, with the exception of losses arising from the other components.

The excitation capacitors CE are so designed that the desired oscillation frequency $f_c$, that is, specific frequency, is obtained for the resonant circuit formed by the stator inductance $L_s$ of the motor and the excitation capacitors CE. The oscillation frequency is obtained from the formula $$f_c = \frac{1}{2\pi\sqrt{L_s C}}.$$

The oscillation frequency $f_c$ determines the lowering rate of the load as the asynchronous machine is acting as a self-excited generator. In an embodiment, the suitable load lowering rate corresponds to one half of the nominal speed of the asynchronous machine whereby the oscillation frequency $f_c$ is obtained by means of the nominal supply frequency $f_N$ of the asynchronous machine, from the formula $$f_c = \frac{1}{2} f_N.$$

The stator inductance is a function of the exciting current of the asynchronous machine and, due to saturation of iron, non-linear. As a result, the resonant circuit may be formed and the excitation take place at many different capacitance values, whereby it is possible to affect the frequency and hence the lowering rate.

The electric power produced by an asynchronous machine during its self-excited generator operation has to be converted to heat in the load resistor R1. For determining the resistance of the load resistor R1, the following equation may be used $$R1 = \frac{U^2}{P_L} = \frac{U^2}{\mu_m P_M},$$

where U is the voltage produced by the asynchronous machine during self-excited generator operation, $P_L$ is the power going to the load resistor R1, $\mu_m$ is the operating efficiency of the asynchronous machine, and $P_M$ is the shaft power of the asynchronous machine. The voltage U produced by an asynchronous machine during self-excited generator operation is in an embodiment one half of the nominal voltage $U_N$ of the asynchronous machine, whereby the excitation is kept nominal, that is, at the designed rated value.

When the load resistor assembly is asymmetrical, the operating efficiency of an asynchronous machine is lower during self-excited generator operation than when the load resistor assembly is symmetrical. In the case of the load resistor assembly 12 according to FIG. 2, the operating efficiency $\mu_m$ of an asynchronous machine is approximately 10 percent less than in the case where the load is symmetrical. This is due to the higher harmonic content of the load current and the resulting additional losses. A low operating efficiency during self-excited generator operation is not actually a harmful matter, because self-excited generator operation is mainly intended for emergency load lowering in which the power produced by self-excited generator operation has to be consumed in one way or another.

An asymmetric load resistor assembly may comprise one, two, or three load resistors. The load resistor assembly 12' in the motor assembly of FIG. 3 comprises two load resistors, and the load resistor assembly 12" in the motor assembly of FIG. 4 comprises three load resistors. Except for the load resistor assemblies and load resistor switch means, the motor assemblies of FIGS. 3 and 4 are equal to the motor assembly of FIG. 2.

Figure 3:
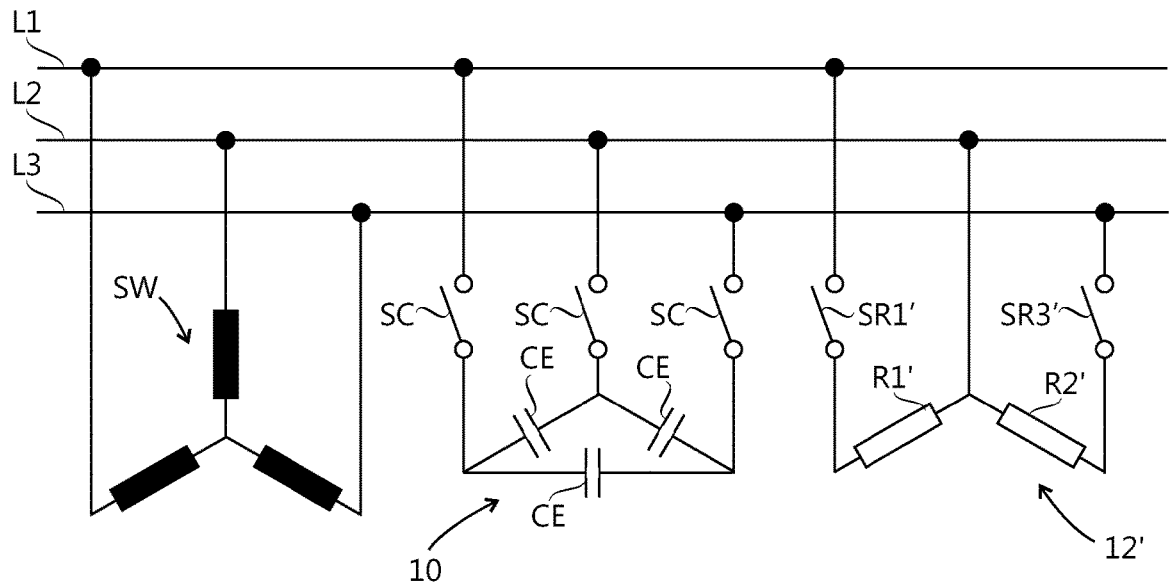
FIGS. 3-6 show the alternative embodiments of the motor assembly.

The load resistor assembly 12' of FIG. 3 comprises two load resistors R1' and R2', both of which are arranged to be connected between two stator phases of an asynchronous machine during self-excited generator operation of the asynchronous machine. The load resistor R1' is connected between the stator phases L1 and L2 through a resistor switch SR1', and the load resistor R2' is connected between the stator phases L2 and L3 through a resistor switch SR3'. The load resistor assembly 12' is asymmetrical, because the point between the load resistors R1' and R2' is connected to the stator phase L2 by a conductor that has a very small resistance.

The resistances of the load resistors R1' and R2' are identical. In an alternative embodiment where the load resistor assembly comprises exactly two load resistors, the resistances of the load resistors are unequal.

Figure 4:
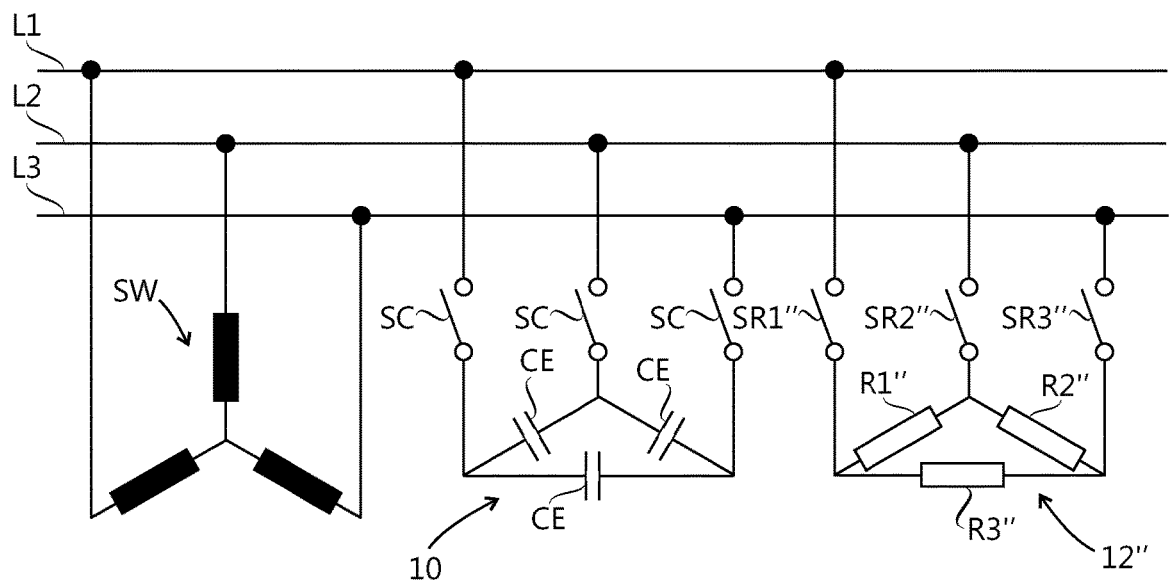

The load resistor assembly 12" of FIG. 4 comprises three load resistors R1", R2", and R3", which are connected by a delta connection to the stator phases L1-L3 by the load resistor switch means. The load resistor switch means comprises three resistor switches SR1", SR2", and SR3". The load resistor assembly 12" is asymmetrical, because the load resistor R1" has a substantially unequal resistance to the load resistor R2". In this context, the resistances are considered substantially unequal if the resistance of the higher-resistance resistor is more than 10% higher than the resistance of the lower-resistance resistor. Increasing the asymmetry improves the starting reliability of the self-excitation of an asynchronous machine. The resistances of the load resistors R2" and R3" are equal.

In an alternative embodiment in which the load resistor assembly comprises three load resistors, the resistances of all the load resistors are unequal. In a second alternative embodiment in which the load resistor assembly comprises three load resistors, the load resistor switch means only comprises two resistor switches, that is, the resistor switch corresponding to the switch SR2", for example, has been replaced by a conductor portion.

Figure 5:
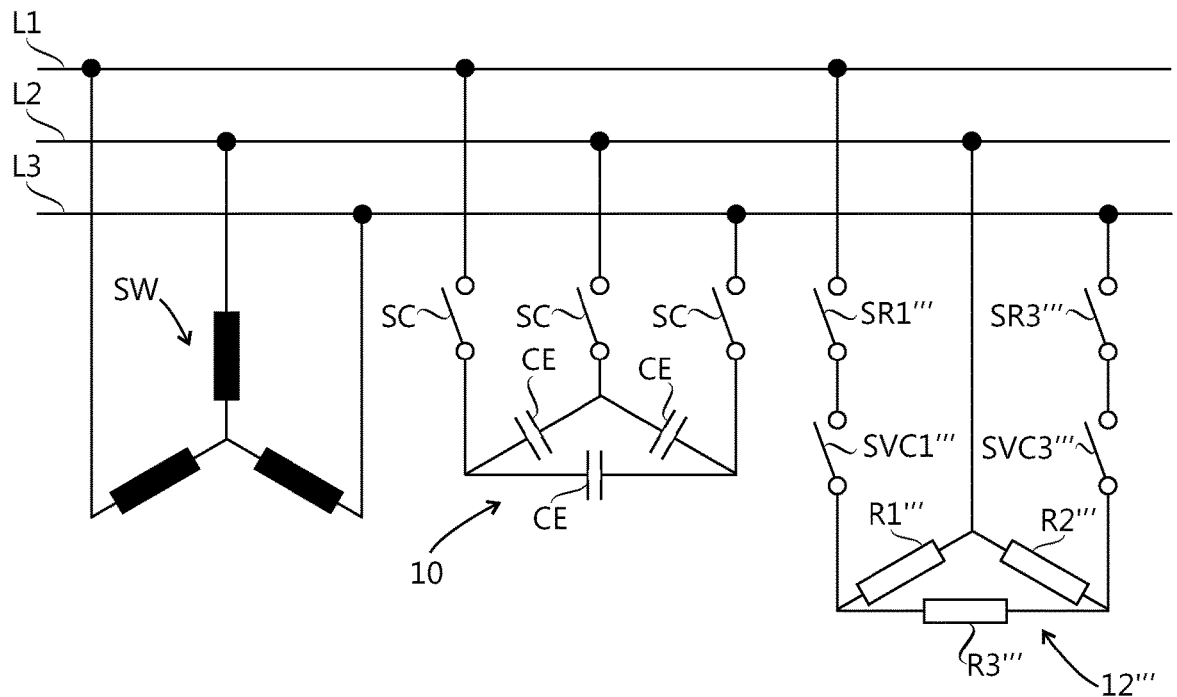

The load resistor switch means of the motor assembly in FIG. 5 comprises, in addition to the resistor switches SR1''' and SR3''', voltage-controlled switches SVC1''' and SVC3'''. Each voltage-controlled switch is operationally connected to the corresponding stator phase so that the voltage-controlled switch closes in response to the existence of a voltage of a predetermined level in the corresponding stator phase. The voltage-controlled switch SVC1''' is operationally connected to the stator phase L1, and the voltage-controlled switch SVC3''' is operationally connected to the stator phase L3. The voltage sensors and signal conductors used for implementing the operational connection are not shown in FIG. 5.

The voltage-controlled switch SVC1''' is connected in series with the resistor switch SR1'''. The voltage-controlled switch SVC3''' is connected in series with the resistor switch SR3'''. The point between the load resistors R1''' and R2''' is connected to the stator phase L2 by a conductor that has a very small resistance. With the exception of the load resistor switch means, the motor assembly of FIG. 5 is equal to the motor assembly of FIG. 4.

The load resistors R1''', R2''', and R3''' of the load resistor assembly 12''' are connected by a delta connection to the stator phases L1-L3 by the load resistor switch means. The load resistor assembly 12''' is connected to the stator phases L1-L3 in the situations in which both the resistor switches SR1''' and SR3''' as well as the voltage-controlled switches SVC1''' and SVC3''' are closed.

Figure 6:
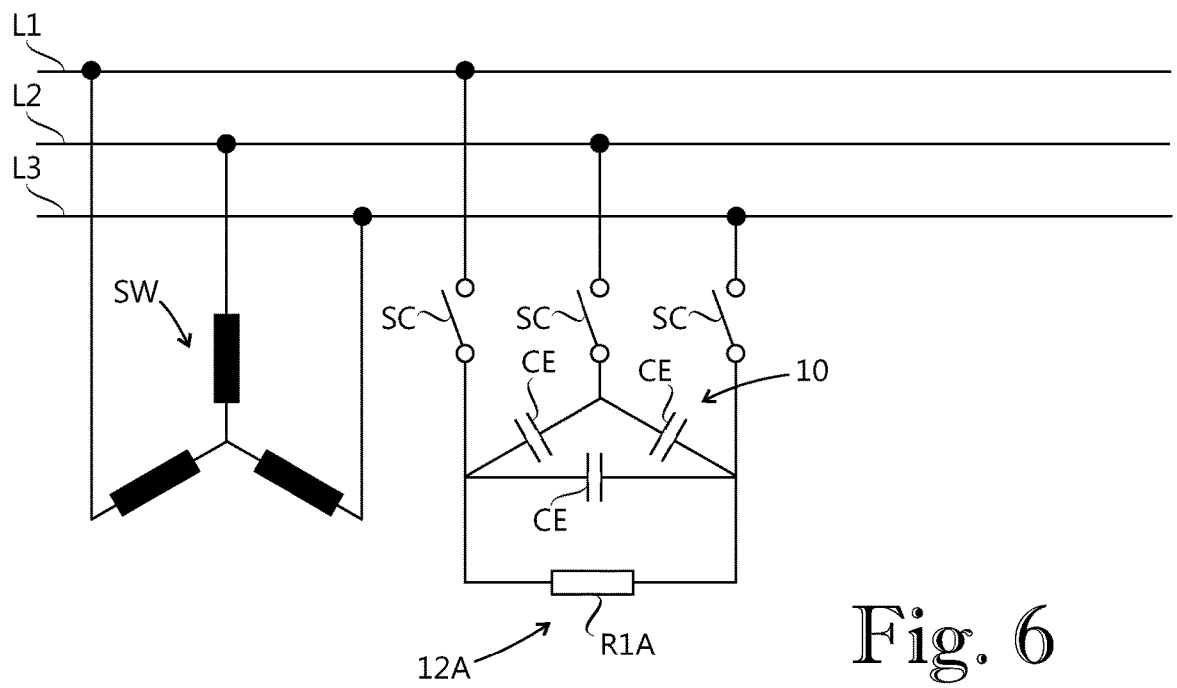

In the motor assembly of FIG. 6, the load resistor assembly 12A comprises one load resistor R1A, only, which is connected in parallel with one excitation capacitor CE. In the embodiment according to FIG. 6, the capacitor assembly 10 and the capacitor switch means are equal to those in the embodiment of FIG. 2. A separate resistor switch will not be needed for the load resistor R1A, because the capacitor switch means is arranged to connect the load resistor assembly 12A to the stator phases. So, the load resistor switch means and the capacitor switch means are integrated and arranged to be controlled by the same control signal.

In the motor assemblies according to FIGS. 2-6, each capacitor switch and resistor switch may be a known contactor suitable for the purpose of use. Alternatively, it is feasible to use another type of switching device as the capacitor switches and resistor switches.

The load resistor switch means of the motor assembly according to the invention may be an intelligent load resistor switch means. An intelligent load resistor switch means is arranged to connect the load resistor assembly to the stator phases in a voltage-controlled manner in a situation in which an operator or automatism has initiated emergency load lowering. An intelligent load resistor switch means causes the command, which an operator gives to carry out emergency load lowering, to connect the load resistor assembly to the stator phases only after a voltage of a predetermined level is detected in the stator phases L1-L3. This is to make sure that the load resistor assembly connects to the stator phases only after the self-excitation of the asynchronous machine has started.

The load resistor switch means in each of the motor assemblies presented in FIGS. 2-4 may be replaced by an intelligent load resistor switch means. In the motor assembly of FIG. 4, for example, this would mean that the resistor switches SR1", SR2", and SR3" that are controllable by an operator would be converted into intelligent resistor switches which a command by the operator to initiate an emergency load lowering would shift into a standby state in which the intelligent resistor switches would monitor whether a voltage of a predetermined level is present in the stator phases L1-L3. The intelligent resistor switches in standby state would close in response to the voltage of a predetermined level being detected in the stator phases L1-L3.

An intelligent load resistor switch means may be arranged to connect the load resistor assembly to the stator phases when predetermined terms are fulfilled. The predetermined terms may be so chosen that the load resistor assembly connects to the stator phases only when an asynchronous machine is working as a self-excited generator. In an alternative embodiment, the predetermined terms are so chosen that a load resistor assembly may also be connected to the stator phases when the asynchronous machine has a functioning connection to a live electrical power network.

The resistive load brought about by the load resistor assembly may in some embodiments be adjusted during emergency load lowering. Adjusting the resistive load allows the lowering rate of the load to be adjusted. In the embodiments in which the load resistor assembly comprises more than one load resistor it is possible to keep different kinds of load resistor combination connected to the stator phases. In an embodiment, the load resistor assembly comprises an adjustable load resistor. If it is not necessary to adjust the load lowering rate, the motor assembly according to the invention may be arranged to be such that the load resistor assembly is constant from start to end of the emergency lowering regardless of the load size.

The motor assembly of the invention may be utilized in many types of hoist drives, such as elevators, floodgates, lift bridges, cableways, and mine hoists. Self-excited generator operation of the asynchronous machine of the motor assembly may be utilized not only to lower an individual load but also to lower a part of the hoist drive. For example, a harbour crane may utilize self-excited generator operation of an asynchronous machine to lower the boom of the harbour crane.

The hoist drive shown in FIG. 1 is just one example of a hoist drive arranged for hoisting a load. In alternative embodiments, the rope may be replaced by a chain, belt, or mechanical transmission, for example.

It is apparent to one skilled in the art that the basic idea of the invention may be implemented in many different ways. The invention and its embodiments are thus not restricted to the examples described above but may vary within the scope of the claims.

The invention claimed is:

1. A hoist drive comprising:
    a rope;
    a hoisting member attached to the rope; and
    a motor assembly comprising:
        a three-phase asynchronous machine equipped with three stator phases;
        a capacitor assembly;
        a capacitor switch for symmetrically connecting the capacitor assembly to all three stator phases to establish self-excited generator operation of the asynchronous machine;
        a load resistor assembly to establish resistive load for self-excited generator operation of the asynchronous machine; and
        a load resistor switch arranged to connect the load resistor assembly to the stator phases,
        wherein the load resistor assembly is asymmetrical, and
        wherein the load resistor assembly comprises exactly two load resistors, the first of which is connected by the load resistor switch means between a first pair of stator phases of the asynchronous machine during self-excited generator operation of the asynchronous machine, and the second of which is connected by the load resistor switch means between a second pair of stator phases of the asynchronous machine during self-excited generator operation of the asynchronous machine, the second pair of stator phases being different from the first pair of stator phases,
    wherein the motor assembly is operationally connected to the rope to lift a load by means of the hoisting member.

2. The hoist drive as claimed in claim 1, wherein the load resistor assembly comprises one load resistor, only, which is connected by the load resistor switch means between two stator phases of the asynchronous machine during self-excited generator operation of the asynchronous machine.

3. The hoist drive as claimed in claim 1, wherein the load resistor switch comprises at least one voltage-controlled switch, each voltage-controlled switch being operationally connected to a corresponding stator phase so that the voltage-controlled switch closes in response to the presence of a voltage of a predetermined level in the corresponding stator phase.

4. The hoist drive as claimed in claim 1, wherein the capacitor assembly comprises three excitation capacitors, and the load resistor assembly comprises one load resistor, only, which is connected in parallel with one excitation capacitor, and the load resistor switch and the capacitor switch are integrated.

5. The hoist drive as claimed in claim 1, wherein the load resistor switch is an intelligent load resistor switch arranged to connect the load resistor assembly to the stator phases in a voltage-controlled manner in a situation where an emergency lowering of a load has been activated by an operator or automatic operation.

6. The hoist drive as claimed in claim 1, wherein the capacitor assembly comprises three excitation capacitors in such a manner that in said symmetric connection three excitation capacitors are connected to the stator phases by a delta or star connection.

7. The hoist drive as claimed in claim 1, wherein the load resistor switch and the capacitor switch are controlled by the same signal.

8. The hoist drive as claimed in claim 1, wherein the load resistor assembly has a constant resistance value from start to end of an emergency lowering of a load regardless of a load size.

9. The hoist drive as claimed in claim 2, wherein the load resistor switch comprises a resistor switch arranged to connect the load resistor between two stator phases of the asynchronous machine, based on commands by an operator.

10. The hoist drive as claimed in claim 3, wherein each of the voltage-controlled switches is connected in series with the resistor switch controllable by an operator.

11. The hoist drive as claimed in claim 5, wherein the intelligent load resistor switch comprises at least one intelligent resistor switch arranged to transfer to a standby state in response to an operator's command to initiate an emergency load lowering, in which standby state the at least one intelligent resistor switch is monitoring whether a voltage of a predetermined level is present in the stator phases, and closes in response to a detected presence of the voltage of the predetermined level in the stator phases.

12. A hoist drive comprising:
    a rope;
    a hoisting member attached to the rope; and
    a motor assembly comprising:
        a three-phase asynchronous machine equipped with three stator phases;
        a capacitor assembly;
        a capacitor switch for symmetrically connecting the capacitor assembly to all three stator phases to establish self-excited generator operation of the asynchronous machine;
        a load resistor assembly to establish resistive load for self-excited generator operation of the asynchronous machine; and
        a load resistor switch arranged to connect the load resistor assembly to the stator phases,
        wherein the load resistor assembly is asymmetrical, and the load resistor assembly comprises three load resistors, each of which is connected by the load resistor switch means between two stator phases of the asynchronous machine during self-excited generator operation of the asynchronous machine, one of the three load resistors having a substantially different resistance from another second resistor of the three load resistors,
    wherein the motor assembly is operationally connected to the rope to lift a load by means of the hoisting member.

13. The hoist drive as claimed in claim 12, wherein the load resistor assembly comprises one load resistor, only, which is connected by the load resistor switch means between two stator phases of the asynchronous machine during self-excited generator operation of the asynchronous machine.

14. The hoist drive as claimed in claim 12, wherein the load resistor switch comprises at least one voltage-controlled switch, each voltage-controlled switch being operationally connected to a corresponding stator phase so that the voltage-controlled switch closes in response to the presence of a voltage of a predetermined level in the corresponding stator phase.

15. The hoist drive as claimed in claim 12, wherein the capacitor assembly comprises three excitation capacitors, and the load resistor assembly comprises one load resistor, only, which is connected in parallel with one excitation capacitor, and the load resistor switch and the capacitor switch are integrated.

16. The hoist drive as claimed in claim 12, wherein the load resistor switch is an intelligent load resistor switch arranged to connect the load resistor assembly to the stator phases in a voltage-controlled manner in a situation where an emergency lowering of a load has been activated by an operator or automatic operation.

17. The hoist drive as claimed in claim 13, wherein the load resistor switch comprises a resistor switch arranged to connect the load resistor between two stator phases of the asynchronous machine, based on commands by an operator.

18. The hoist drive as claimed in claim 14, wherein each of the voltage-controlled switches is connected in series with the resistor switch controllable by an operator.

* * * * *